(No Model.) 2 Sheets—Sheet 1.

R. H. GUTHRIE.
TRAP FOR FLIES ON ANIMALS.

No. 516,048. Patented Mar. 6, 1894.

Witnesses

Inventor (No Model.) 2 Sheets—Sheet 2.

R. H. GUTHRIE.
TRAP FOR FLIES ON ANIMALS.

No. 516,048. Patented Mar. 6, 1894.

Witnesses
Inventor

UNITED STATES PATENT OFFICE.

ROBERT H. GUTHRIE, OF SOUTH DUMFRIES, CANADA.

TRAP FOR FLIES ON ANIMALS.

SPECIFICATION forming part of Letters Patent No. 516,048, dated March 6, 1894.

Application filed September 22, 1893. Serial No. 486,237. (No model.)

*To all whom it may concern:*

Be it known that I, ROBERT HENRY GUTHRIE, yeoman, of the township of South Dumfries, in the county of Brant, in the Province of Ontario, Canada, have invented a certain new and useful Trap for Horn-Flies; and I hereby declare that the following description is sufficiently full, clear, and exact as to enable others skilled in the art to which it appertains to make and use the same.

The pest of the horn-fly has of late years been brought prominently to the notice of farmers and cattle owners by the tenacity with which it worries the cattle by eating into the most tender portions of the flesh and of feeding preferably on those parts where it cannot easily be dislodged. The parts of the cattle most troubled by this fly are the shoulders, the head, and the rump, these parts being so located that the fly cannot be readily dislodged by the tail or mouth of the animal. This fly it might be stated puts in an appearance early in May and remains usually until the first frosts of fall continuing its operations day and night during the intervening period. Owing to the peculiar method which this fly has of providing a fresh pest for the ensuing spring it has been impossible to exterminate it by any of the usual methods. Furthermore as this fly sucks the blood of the animal causing the loss of flesh and the formation of sores developing possibly in the course of time into running sores, it can readily be conceived that it is extremely advisable to provide some means whereby this pest can be trapped and exterminated.

The object of this invention is to provide a device by means of which the horn-fly can be removed from the cattle with rapidity and when removed, can be secured and exterminated and the invention consists essentially of the device hereinafter described and more particularly pointed out in the claims.

Figure 1:
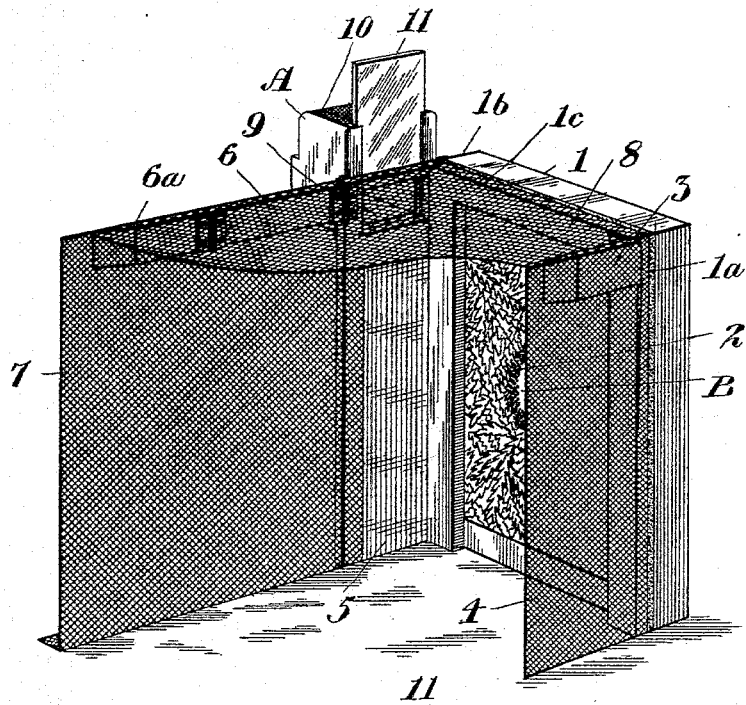
Figure 2:
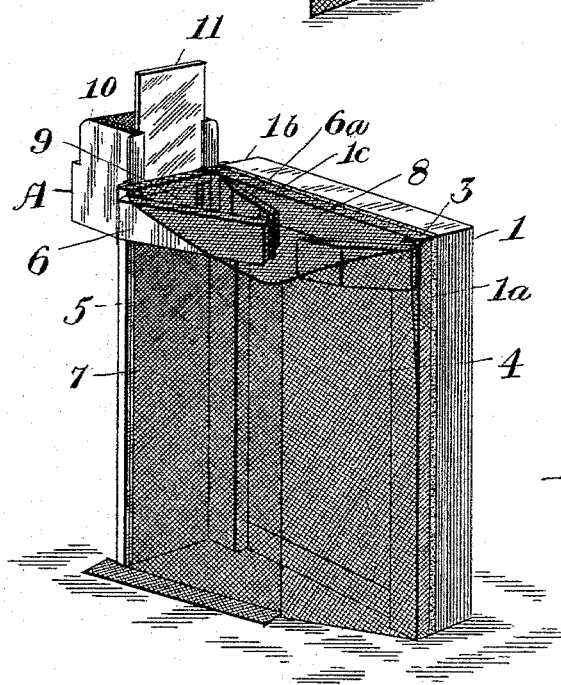
Figure 3:
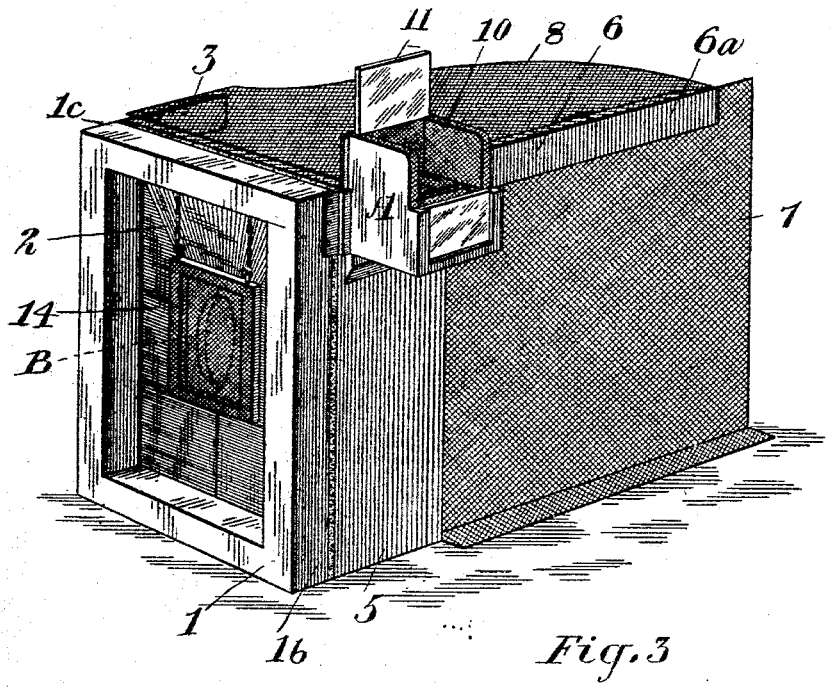
Figure 4:
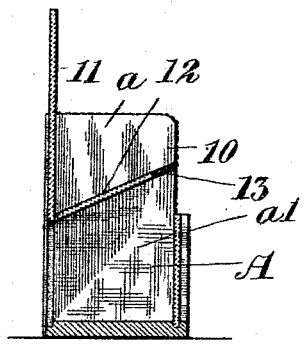

In the drawings: Figure 1 is a perspective view of the device showing it ready for the cattle to pass through. Fig. 2 is a perspective view of the same showing it closed after the cattle have passed through. Fig. 3 is a perspective view of the opposite side to that shown in Figs. 1 and 2. Fig. 4 is a sectional view through the cage.

Like numerals and letters of reference refer to like parts throughout the specification and drawings.

The apparatus consists of a frame work 1 of such a size as to fit any of the ordinary sizes of stable doors. In the frame work 1 is a brush 2 preferably of broom-corn or some other similar substance, and formed through the brush 2 is an opening "B" to permit of the passage of the cattle through the apparatus. Extending outwardly from the top of one side $1^a$ of the frame work 1 is a hinged arm 3 to which is fastened the top of the fabric netting 4 while the one edge of the netting is fastened to the side $1^a$ and extends to the bottom thereof. The side $1^b$ of the frame work 1 is extended to form a wall 5. Extending outwardly from the top of the wall 5 is a hinged arm 6 having a hinged extension $6^a$ and attached to the arm 6 and extension $6^a$ is a fabric netting 7 which is also attached to the side of the wall 5 and extends to the bottom thereof. Attached to the cross piece $1^c$ and to the arm 6 and extension $6^a$ is a fabric netting 8. The fabric nettings 4, 7, and 8 form respectively the two sides and the top of the trap for the flies. Formed through the wall 5 is an opening 9 which enters the lower portion of the cage "A" detachably connected to the outer side of the wall 5. This cage "A" is composed of a frame work 10 which has formed in that side of it adjacent to the outer side of the wall 5 guides for the reception of a slide 11 to close the opening 9 through the said wall 5 and a corresponding opening into the cage. Within the cage "A" is a partition 12 dividing it into an upper section $a$ and a lower section $a'$. The partition 12 it will be noticed by reference to Fig. 4 is located above the top of the opening into the cage and is inclined from the said opening upwardly toward the front and formed through the partition 12 is an opening 13 to admit of the passage of the flies from the lower section $a'$ into the upper section $a$.

In the operation of the device the cattle pass through the brush 2 and during their passage the flies are removed by means of the said brush. Before and during the passage of the cattle the apparatus is opened into the position shown in Fig. 1 and after the passage of the cattle through the said brush the apparatus is closed as shown in Fig. 2. As before stated the flies are removed by the brush 2 during the passage of the cattle through the said brush and the flies after being removed are prevented from following the cattle by the opening through the said brush being closed by a cover 14. After the flies have been removed by the brush and the passage of the flies through the brush has been arrested the arm 6 and extension 6ª carrying the nettings 7 and 8 are closed in on the brush 2 and the arm 3 is closed on the arm 6 allowing the nettings 4, 7, and 8 to form the trap shown in Fig. 2. After the flies have been trapped by the netting they are driven through the opening 9 into the cage "A" the slide 11 is lowered to close the opening 9 and the corresponding opening into the said cage. After all the flies have been driven into the cage A and entrapped therein, the cage A is removed and inserted in a hot oven or furnace and the flies preferably destroyed by excessive heat, after which the trap is emptied and returned to place ready to receive another installment of the horn fly. The front of the brush 2 is preferably covered by green cedar or light foilage which retains its color for a length of time and with the sight of which the cattle are familiar, in order that confidence may be inspired in the cattle to induce them to pass through the brush without objection. As before stated the opening "B" is closed by a removable cover 14 and this cover it may now be stated may, if found convenient, be hinged to the cross piece 1ᶜ.

I do not confine myself, in the manufacture of the brush to the use of broom corn, nor do I confine myself to any particular shape or size for the frame work as I may use any material suitable for the purpose in the manufacture of the brush, and construct the frame work of such a size and shape and of such material as will be most suitable for the particular purpose for which it was intended.

Having thus fully described my invention, what I claim as new, and desire Letters Patent for, is—

1. A trap for horn flies consisting of sides, and end frame composed of brushes, said brushes having an opening therethrough to permit the passage of the cattle and to remove the insect, and a supplemental trap detachably secured to the main trap for finally securing the insects, substantially as described.

2. A trap for horn flies consisting of reticulated sides, and end frame composed of brushes, said brushes having an opening therethrough to permit the passage of the cattle and to remove the insects, a cover to close the opening through the brushes after the passage of the cattle, and a supplemental trap detachably secured to the main trap for finally securing the insects, substantially as described.

3. In a trap for horn-flies the combination of a frame a brush mounted in said frame, said brush having an opening to permit the passage of the cattle therethrough, hinged arms connected to the top of said frame, fabric netting secured to the top and sides of said arms to form a trap for flies after being removed by said brush, a cage and an opening from said trap into said cage substantially as described.

Toronto, September 7, 1893.

R. H. GUTHRIE.

In presence of—
C. H. RICHES,
F. S. RICHES.